US008412405B2

(12) United States Patent
Enomoto et al.

(10) Patent No.: US 8,412,405 B2
(45) Date of Patent: Apr. 2, 2013

(54) ELECTRONIC CONTROL SYSTEM AND METHOD FOR VEHICLE DIAGNOSIS

(75) Inventors: Hiroyuki Enomoto, Kariya (JP); Kokichi Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 185 days.

(21) Appl. No.: 12/805,256

(22) Filed: Jul. 21, 2010

(65) Prior Publication Data

US 2010/0292892 A1 Nov. 18, 2010

Related U.S. Application Data

(62) Division of application No. 12/180,754, filed on Jul. 28, 2008, now Pat. No. 7,788,005.

(30) Foreign Application Priority Data

Aug. 3, 2007 (JP) ................................ 2007-203109
Nov. 14, 2007 (JP) ................................ 2007-295490

(51) Int. Cl.
*G01M 17/00* (2006.01)
*G06F 7/00* (2006.01)
*G06F 19/00* (2011.01)

(52) U.S. Cl. ......... 701/32.3; 701/1; 701/29.1; 701/32.1; 701/32.4; 701/32.5; 701/33.2

(58) Field of Classification Search .... 701/1, 29.1–32.5, 701/33.2–34.4; 340/853.2, 853.1, 870.01–870.44, 340/945–983, 425.5–426.1, 428–430, 426.11–426.36; 700/177; 702/183
See application file for complete search history.

(56) References Cited

U.S. PATENT DOCUMENTS 5,388,045 A * 2/1995 Kamiya et al. ............... 701/33.4
5,964,813 A * 10/1999 Ishii et al. .................... 701/29.2

(Continued)

FOREIGN PATENT DOCUMENTS

JP 07-049293 2/1995
JP 08-093544 4/1996

(Continued)

OTHER PUBLICATIONS

Office Action (2 pgs.) dated Feb. 8, 2012 issued in corresponding Japanese Application No. 2009-222640 with an at least partial English-language translation thereof (3 pgs.).

(Continued)

*Primary Examiner* — Khoi Tran
*Assistant Examiner* — Bhavesh V Amin
(74) *Attorney, Agent, or Firm* — Nixon & Vanderhye PC

(57) ABSTRACT

A vehicle diagnosis system includes an electronic control unit, which executes a diagnosing process for determining whether any abnormality is present in a vehicle based on signals from vehicle devices. When any abnormality is detected, the electronic control unit stores in an EEPROM a diagnosis result indicative of the abnormality when a storage permission flag in the EEPROM is in the on-state. The storage permission flag is turned on from the off-state when receiving a storage permission command from an external unit. Thus, the storage of the diagnosis result into the EEPROM may be permitted at the time of transmitting the storage permission command externally to the ECU.

20 Claims, 9 Drawing Sheets

U.S. PATENT DOCUMENTS

| | | | | |
|---|---|---|---|---|
| 6,198,390 | B1 * | 3/2001 | Schlager et al. | 340/540 |
| 6,259,381 | B1 * | 7/2001 | Small | 340/988 |
| 6,285,931 | B1 * | 9/2001 | Hattori et al. | 701/29.1 |
| 6,356,824 | B1 * | 3/2002 | Chene et al. | 701/29.3 |
| 6,401,163 | B1 * | 6/2002 | Kondo et al. | 711/100 |
| 6,415,210 | B2 * | 7/2002 | Hozuka et al. | 701/31.4 |
| 6,606,561 | B2 * | 8/2003 | Flick | 701/484 |
| 6,615,119 | B1 * | 9/2003 | Shimizu | 701/31.6 |
| 6,693,563 | B2 * | 2/2004 | Flick | 340/989 |
| 6,748,305 | B1 * | 6/2004 | Klausner et al. | 701/29.4 |
| 6,957,135 | B2 * | 10/2005 | Okada et al. | 701/31.4 |
| 6,990,962 | B2 | 1/2006 | Suzuki | |
| 7,203,581 | B2 * | 4/2007 | Okada | 701/33.4 |
| 7,229,373 | B2 * | 6/2007 | Yamamoto et al. | 474/28 |
| 7,248,959 | B2 * | 7/2007 | Enomoto et al. | 701/102 |
| 7,343,306 | B1 * | 3/2008 | Bates et al. | 705/4 |
| 7,489,049 | B2 * | 2/2009 | Komatsu et al. | 307/10.2 |
| 7,788,005 | B2 * | 8/2010 | Enomoto et al. | 701/29.6 |
| 7,809,481 | B2 * | 10/2010 | Okada et al. | 701/31.4 |
| 2001/0037168 | A1 * | 11/2001 | Hozuka et al. | 701/29 |
| 2006/0052919 | A1 * | 3/2006 | Hong et al. | 701/29 |
| 2006/0287805 | A1 * | 12/2006 | Enomoto et al. | 701/113 |
| 2007/0083305 | A1 * | 4/2007 | Okada et al. | 701/29 |
| 2007/0173986 | A1 | 7/2007 | Inbarajan | |
| 2007/0180318 | A1 | 8/2007 | Morozumi | |
| 2009/0037044 | A1 | 2/2009 | Enomoto et al. | |
| 2009/0271064 | A1 * | 10/2009 | Enomoto et al. | 701/33 |
| 2009/0281689 | A1 * | 11/2009 | Suganuma et al. | 701/35 |
| 2010/0220569 | A1 * | 9/2010 | Ujiie et al. | 369/53.24 |

FOREIGN PATENT DOCUMENTS

| | | |
|---|---|---|
| JP | 08-202441 | 8/1996 |
| JP | 10-138780 | 5/1998 |
| JP | 10-161934 | 6/1998 |
| JP | 11-141391 | 5/1999 |
| JP | 11-141393 | 5/1999 |
| JP | 2002-235599 | 8/2002 |
| JP | 2004-346743 | 12/2004 |
| JP | 2006-291730 | 10/2006 |
| JP | 2007-205942 | 8/2007 |

OTHER PUBLICATIONS

Office Action dated Jul. 23, 2009 issued in corresponding Japanese Application No. 2007-295490 with an English-language translation thereof.

Notice of Allowance dated Oct. 22, 2009 issued in corresponding Japanese Application No. 2007-295490.

"Malfunction and Diagnostic System Requirement for 2004 and Subsequent Model-Year Passenger Cars, Light-Duty Trucks, and Medium-Duty Vehicles and Engines", Title 13, California Code Regulations, Section 1968.2 (OBD II).

U.S. Appl. No. 12/185,282, Nakagaki et al., filed Aug. 4, 2008, (JP 2007-203108).

U.S. Appl. No. 12/185,274, Teramura, filed Aug. 4, 2008, (JP 2007-203110).

Office Action (8 pgs.) dated Oct. 21, 2010 issued in corresponding European Application No. 08013382.0-1229.

* cited by examiner

ELECTRONIC CONTROL SYSTEM AND METHOD FOR VEHICLE DIAGNOSIS

CROSS REFERENCE TO RELATED APPLICATION

This application is the divisional of U.S. application Ser. No. 12/180,754 filed Jul. 28, 2008, which claims priority to Japanese Application No. 2007-203109 filed Aug. 3, 2007 and Japanese Application No. 2007-295490 filed Nov. 14, 2007, the entire contents of each of which are hereby incorporated by reference.

FIELD OF THE INVENTION

The present invention relates to an electronic control system and method for vehicle diagnosis that store a diagnosis result in a rewritable nonvolatile memory.

BACKGROUND OF THE INVENTION

Various ECUs are installed in a typical vehicle for controlling various vehicle equipment, such as a vehicle engine. An ECU for vehicle engine control also diagnoses various conditions, that is, checks whether each condition is normal or abnormal based on data from various vehicle devices such as sensors, switches and actuators mounted in the vehicle. When a condition is determined as abnormal, the ECU stores abnormality data, such as a diagnostic trouble code (DTC), as the diagnosis result indicative of abnormality in a rewritable memory where the stored abnormality data is maintained.

The ECU of the above type may operate in a state where the ECU has not yet been installed or assembled in the vehicle, such as during manufacture of the vehicle. In such a state, some of peripheral equipment such as sensors, switches and actuators are not yet connected to the ECU. When the ECU executes diagnosis in such a state, the incomplete assembly may be detected as an abnormality, and unnecessary or erroneous diagnosis results may be stored in a memory.

To avoid such storing of unnecessary or erroneous diagnosis results, JP 2006-291730A proposes an ECU that checks whether a vehicle is actually used by a user based on an operating condition of the vehicle. Such an operating condition may be a vehicle travel speed or engine revolutions. The ECU starts to store diagnosis results in a memory after it has been determined that the vehicle is actually used by the user. The memory is a standby RAM continuously backed up by electric power to back up storage of the stored data even after the supply of electric power to the ECU is turned off, or an EEPROM as a nonvolatile memory.

However, in the conventional electronic control apparatus, it is not possible to determine the actual time the storage begins, since the condition for starting to store the diagnosis results includes the operating state which varies from vehicle to vehicle or from user to user. Such an operating state is not considered to occur in the manufacturing line of the vehicle. Any diagnosis results of abnormalities, which have occurred relatively immediately after the vehicle has begun to be used by the user should be necessarily originally stored. However, in the conventional electronic control apparatus, such diagnosis results cannot be stored in the memory, unless the predetermined operating state such as the vehicle travel is satisfied.

It should further be noted that with regard to vehicle diagnosis, the regulation of the California Air Resources Board (CARB) requires that any diagnostic trouble code (DTC) that has been stored as a confirmed fault code based on diagnosis result must be kept stored in a rewritable nonvolatile memory such as EEPROM of an ECU as a permanent failure code, such as a permanent diagnostic trouble code (PDTC). In order to prevent tampering and concealment of, for example, potential exhaust emissions failures, the regulation also stipulates that the PDTC must not be erasable by a command from an external tool capable of communicating with the ECU.

SUMMARY OF THE INVENTION

It is therefore an object of the present invention to provide an electronic control system and method for vehicle diagnosis, which securely store only necessary diagnosis results in a rewritable nonvolatile memory.

According to one aspect of an electronic control system and method for vehicle diagnosis, an ECU has a rewritable nonvolatile memory and is configured to diagnose vehicle devices mounted in the vehicle based on signals from the vehicle devices and store in the rewritable nonvolatile memory a diagnosis result indicating abnormality of a vehicle device diagnosed as abnormal. The ECU is further configured to permit the diagnosis result to be stored in the rewritable nonvolatile memory only after receiving storage permission externally from a device external to the ECU.

The storage permission is transmitted from the device external to the ECU in a period after completion of manufacture of the vehicle and before use of the vehicle.

According to another aspect, a specific tool may be utilized to permit an electronic control system to store a permanent fault code into a rewritable nonvolatile memory.

According a further aspect, a change from a conventional function check mode to a normal operation mode or in-use mode, which is set after the function check mode is completed, may be utilized to permit an electronic control system to store a permanent fault code into a rewritable nonvolatile memory.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXAMPLE EMBODIMENTS

First Example Embodiment

Figure 1:
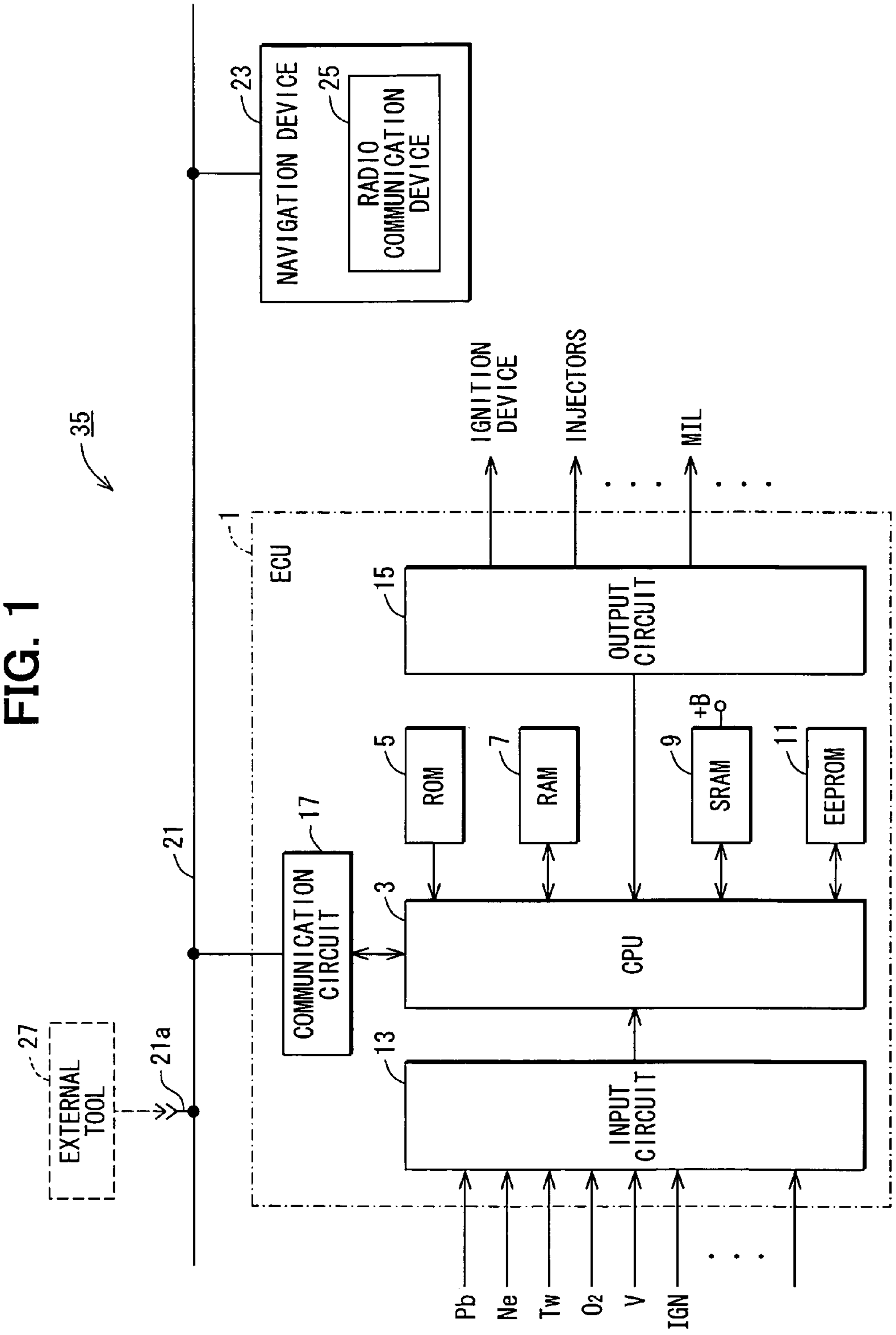
FIG. 1 is a block diagram illustrating an electronic control system for vehicle diagnosis including an ECU in accordance with a first example embodiment.

Referring first to FIG. 1, in accordance with a first example embodiment, an electronic control unit (ECU) 1 is installed in a vehicle 35 to control a vehicle engine and perform diagnosis.

The ECU 1 includes a central processing unit (CPU) 3, a read only memory (ROM) 5 that stores program executed by the CPU 3 and data referred to at the time of program execution, a random access memory (RAM) 7 for temporarily storing data, a standby RAM (SRAM) 9 to which electric power +B is continuously supplied as a back-up power for backing up data storage in the event normal electric power is lost, an electrically erasable programmable read only memory (EEPROM) 11 that is one of rewritable nonvolatile memories, an input circuit 13, and an output circuit 15.

Various signals are input into the CPU 3 through the input circuit 13, the signals providing input data for controlling the engine. The various signals include an output Pb of an intake pipe pressure sensor, an output Ne of an engine revolution sensor, an output Tw of an engine coolant water temperature sensor, an output $O_2$ of an oxygen sensor or air-fuel ratio sensor of an exhaust system, an output V of a vehicle speed sensor, and an output IGN of an ignition switch. The output circuit 15 outputs drive signals to various electric loads, which are actuators such as an ignition device, fuel injectors, or malfunction indicating light (MIL) according to respective commands from the CPU 3.

The CPU 3 is configured by being programmed to execute calculation for engine control based on various signals that are input to the CPU 3 through the input circuit 13, and supply commands to the output circuit 15 based on the calculation results, to thereby control the electric loads related to the control of the engine. For example, the CPU 3 calculates a valve opening timing and a valve opening period of the fuel injectors, and supplies a command for driving the injectors to the output circuit 15 based on the calculation results, to thereby control fuel injection into the engine.

Figure 5:
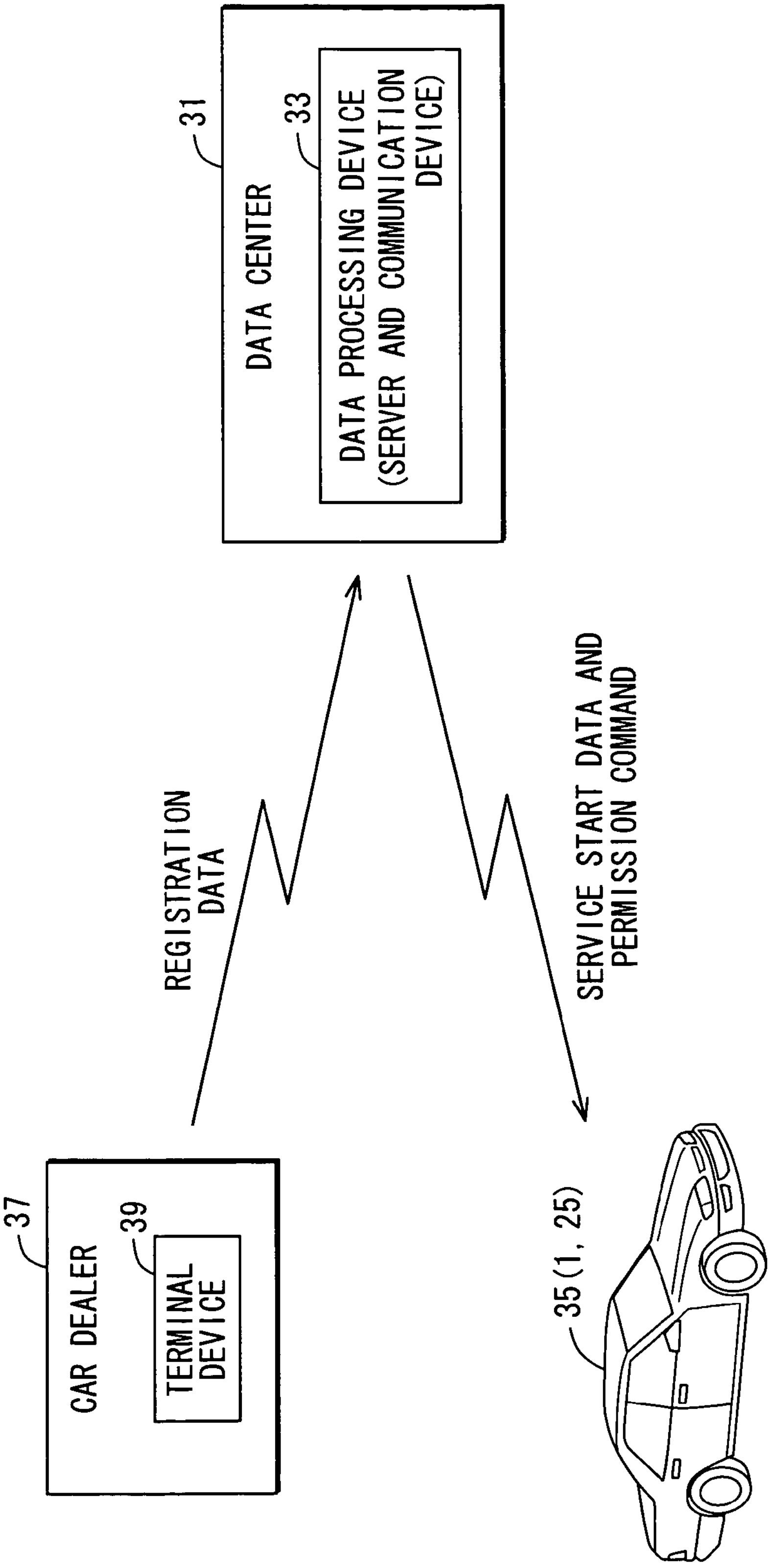
FIG. 5 is a schematic diagram illustrating exemplary communication among a car dealer, a data center and a vehicle including the ECU in accordance with a second example embodiment.
Figure 7:
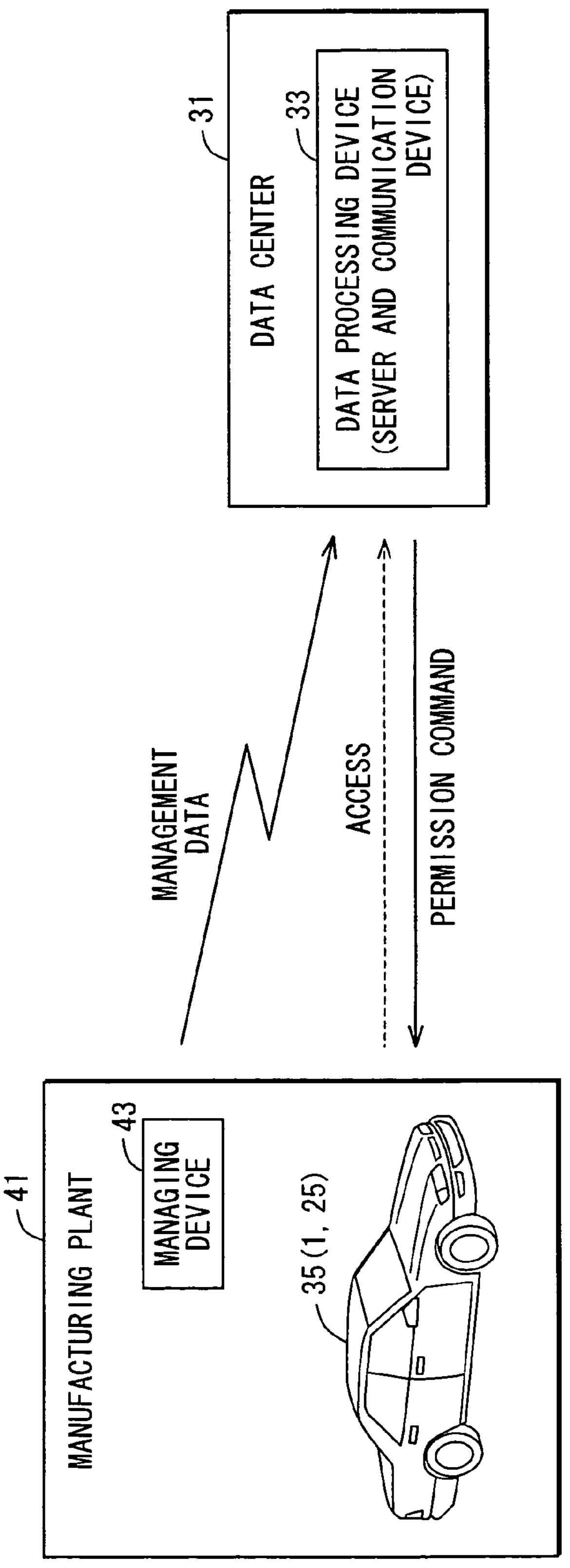
FIG. 7 is a schematic diagram illustrating communication among a manufacturing plant, the data center and the vehicle including the ECU in accordance with a third example embodiment.
Figure 9:
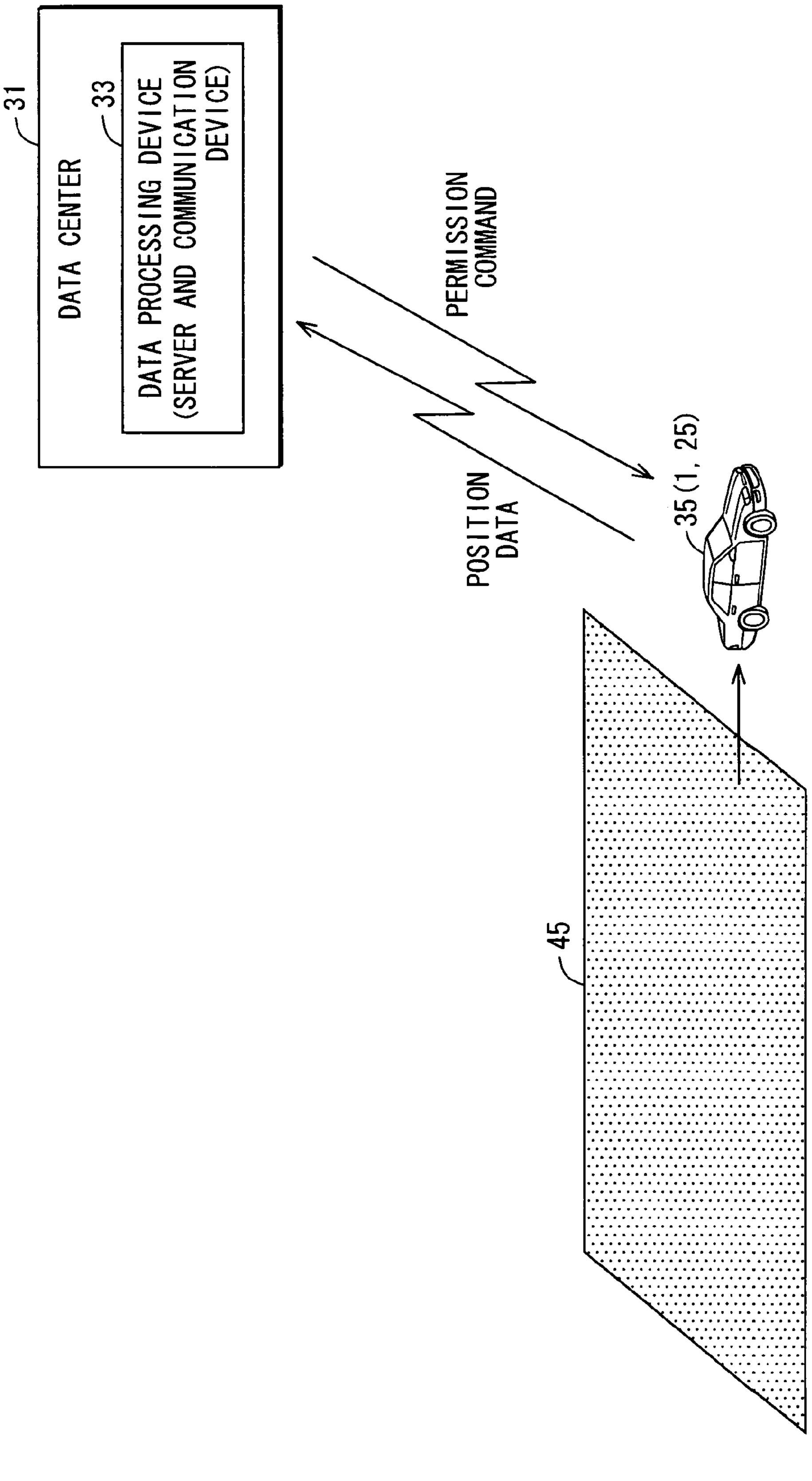
FIG. 9 is a schematic diagram illustrating communication between the data center and the vehicle including the ECU in accordance with a fourth example embodiment.

The ECU 1 is also equipped with a communication circuit 17 for allowing the CPU 3 to communicate with other devices that are connected to a communication line 21 within the vehicle 35. The other devices may include, for example, a navigation device 23, which is external to the ECU 1. For example, the calculation value of a vehicle speed is transmitted from the ECU 1 to the navigation device 23. Also, the navigation device 23 includes a radio communication device 25 for communicating with a data processing device in a data center provided externally from the vehicle as shown in FIG. 5, FIG. 7, and FIG. 9. The data center can execute a process for implementing a telematics service for the vehicle 35 in the conventional manner.

Further, an external tool 27 for conducting a failure diagnosis of the vehicle is detachably coupled to the communication line 21 through a connector 21*a*. The external tool 27 is a hand-held external device having a microcomputer and a display device, or may be a compact personal computer.

The power supplied to the ECU 1 includes an operation power supply supplied from an in-vehicle battery (not shown) in association with the operation of the ignition switch, and a backup power supply that continuously supplies power to the standby RAM 9 from an in-vehicle battery even when the ignition switch is in the off or inactive position. The ECU 1 operates upon receiving the operation power supply when the ignition switch is turned on or activated. Also, a constant voltage generated from the backup power supply by a power supply circuit (not shown) within the ECU 1 continuously supplies power to the standby RAM 9 as the data retention power supply.

Figure 2:
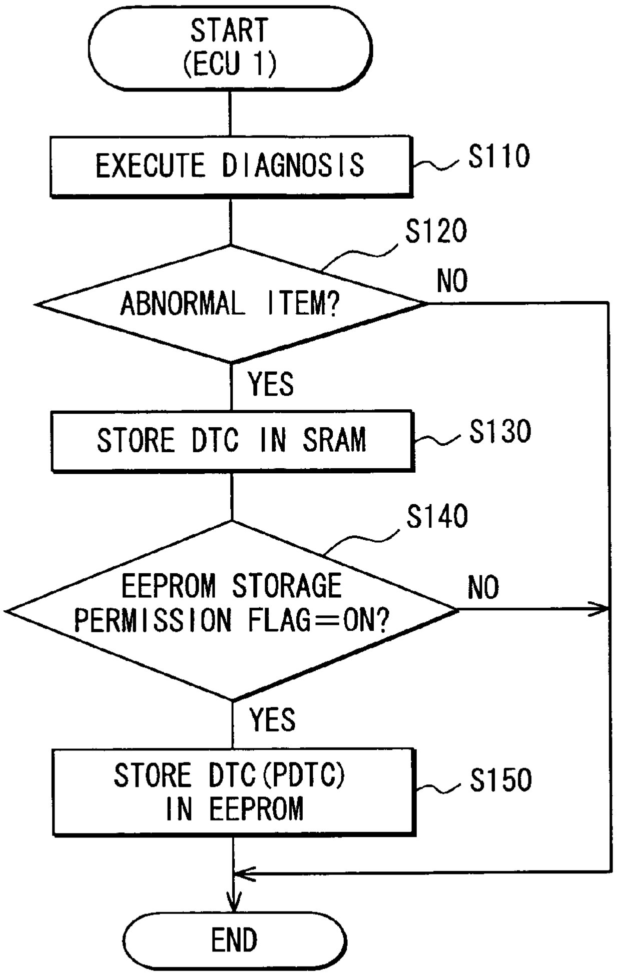
FIG. 2 is a flowchart illustrating a diagnosis result storing process executed by a CPU in the ECU in accordance with the first example embodiment.

In the present example embodiment, the CPU 3 is programmed to regularly execute a diagnosis result storing process shown in FIG. 2, according to a given time period or at given intervals. It should be noted that the diagnosis result storing process is performed separately form the normal process for controlling the engine. When the execution of the diagnosis result storing process starts, the CPU 3 first executes a diagnosing process for detecting an abnormality at S110. The diagnosing process checks whether any abnormality is present in various parts of the vehicle 35 related to signals input from various vehicle devices such as sensors, switches and actuators through the input circuit 13 based on characteristics associated with the signals. The diagnosing process is executed on a predetermined plurality of abnormality detection items. For example, in executing a diagnosing process for detecting an abnormality of a certain sensor, the CPU 3 checks whether the output value of the sensor is normal, by checking whether the output value falls within a predetermined range. If the output value does not fall within the predetermined range, the CPU 3 determines that the sensor is abnormal.

At S120, the CPU 3 checks whether any abnormality detection items have been determined as abnormal in the above-described diagnosing process. If no abnormality detection item has been determined to be abnormal, the CPU 3 ends the diagnosis result storing process. If an abnormality detection item has been determined as abnormal, corresponding to YES at S120, the CPU 3 proceeds to S130, and stores a diagnostic trouble code (DTC) corresponding to the item that has been determined to be abnormal in the standby RAM 9. The DTC refers to a diagnosis result indicating that the item is abnormal. When a predetermined condition is met, for example, when the same abnormality is detected continuously for two vehicle trips, the diagnostic trouble code is stored in the standby RAM 9 as a confirmed fault code and the malfunction indicating light MIL is turned on. Each trip may be defined as a period between on-operation and next on-operation of the ignition switch for starting an engine.

The CPU 3 then checks at S140 whether an EEPROM storage permission flag, which is a storage control flag or data, is in an on-state indicative of the presence or lack of presence of permission. If the flag is not in the on-state or set state, the CPU 3 ends the diagnosis result storing process. The EEPROM storage permission flag may be stored in a specific storage area, such as a first storage area, in the EEPROM 11. It will be appreciated that the flag may be initialized to an off-state at the time of manufacturing the ECU 1.

If the CPU 3 determines that the EEPROM storage permission flag is in the on-state or set state at S140, the CPU 3 proceeds to S150 and stores the DTC corresponding to the item which has been determined as abnormal in the diagnosing process and causes the MIL to turn on as a permanent failure code such as a PDTC, in a storage area, such as a second storage area, of the EEPROM 11 different from the first storage area. The CPU 3 then ends the diagnosis result storing process.

Figure 3:
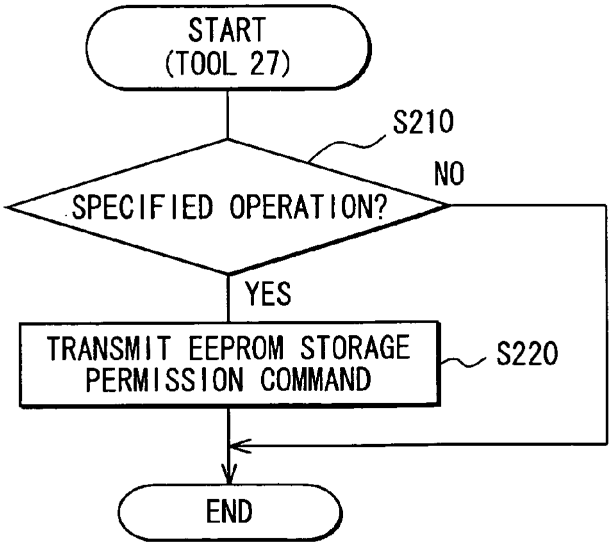
FIG. 3 is a flowchart illustrating an EEPROM storage permission command transmitting process executed by an external tool connectable to the ECU in accordance with the first example embodiment.

It should be noted that the EEPROM storage permission flag is controlled externally by the computer in the external tool 27 programmed to execute an EEPROM storage permission transmitting process shown in FIG. 3.

Specifically, at S210, when the external tool 27 is connected to the communication line 21 through the connector 21*a*, the external tool 27 checks whether a specific operation has been conducted thereupon by an operator. Only when the specific operation is conducted on the external tool 27, corresponding to YES at S210, the external tool 27 transmits an EEPROM storage permission command to the ECU 1 at S220.

Figure 4:
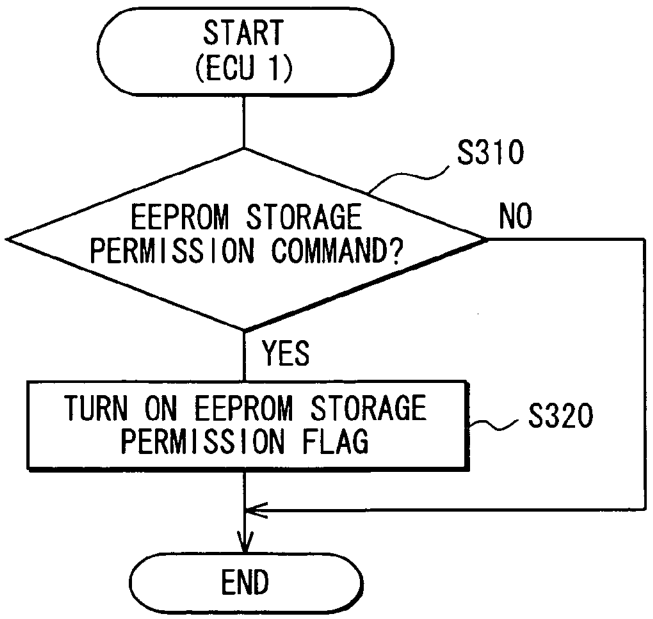
FIG. 4 is a flowchart illustrating a storing permission switching process executed by the CPU in accordance with the first example embodiment.

The CPU 3 is further programmed to regularly execute a permission switching process, for example as shown in FIG. 4, according to a given period when the EEPROM storage permission flag is in the off-state or reset state. When the CPU 3 starts the execution of the permission switching process, the CPU 3 first checks at S310 whether the EEPROM storage permission command has been received through the communication line 21. If the CPU 3 determines the EEPROM storage permission command has not been received, the CPU 3 ends the permission switching process, thereby maintaining the EEPROM storage permission flag in the original off-state. If the CPU 3 determines the EEPROM storage permission command has been received, the CPU 3 proceeds to S320, turns on the EEPROM storage permission flag by rewriting the EEPROM storage permission flag stored in the EEPROM 11 to the on-state, and ends the permission switching process.

Hence, when the external tool 27 is connected to the communication line 21 of the vehicle and the specific operation is conducted on the external tool 27, the EEPROM storage permission command is transmitted from the external tool 27 to the ECU 1. Thus, the storage permission command is transmitted by an external device not installed (not assembled) in the vehicle to change the EEPROM storage permission flag from the off-state or storage non-permission state, to the on-state or storage permission state.

In the ECU 1, when the EEPROM storage permission command transmitted through the communication line 21 is received, the EEPROM storage permission flag is turned on. As a result, a DTC (confirmed fault code) produced thereafter is permitted to be stored as the PDTC in the EEPROM 11 at S150 of FIG. 2.

According to the above-described operation of the ECU 1, the DTC may be permitted to be stored in the EEPROM 11 after the EEPROM storage permission command is transmitted to the ECU 1 from the external tool 27. Therefore, the time point at which permission is given for the DTC to be stored in the EEPROM 11 may be determined with accuracy.

In accordance with the first example embodiments, the EEPROM storage permission command is transmitted to the ECU 1 from the external tool 27 to turn on the EEPROM storage permission flag in the ECU 1 during an interval that spans from a time of complete installation of the ECU 1 along with the associated sensors in the vehicle to a time when use of the vehicle by a user begins. Thus, no unnecessary or erroneous abnormality determination results, such as those occurring during manufacturing, are stored in the EEPROM 11 until the vehicle starts to be used by the user.

More specifically, the EEPROM storage permission command may be transmitted to the ECU 1 from the external tool 27 after the vehicle final assembly has been completed in a manufacturing plant of the vehicle. Further, for example, the EEPROM storage permission command may be transmitted to the ECU 1 from the external tool 27 after a new ECU has been completely installed into the vehicle in a vehicle repair shop or a car dealer in place of a failing ECU.

According to the present example embodiment, an unnecessary or erroneous DTC indicative of abnormality that has been detected during assembling or installing the ECU 1 into the vehicle may be prevented from being stored in the EEPROM 1. Only a DTC associated with an abnormality detected after use of the vehicle by the user begins may be permitted to be stored in the EEPROM 11. Thus, the unnecessary storage in the EEPROM 11 of a DTC occurring before the start of vehicle use may be prevented and an erroneous DTC may be prevented from being stored as a PDTC.

It should be noted that because the storage by the ECU 1 of the DTC in the standby RAM 9 is permitted at S130, a DTC indicative of an abnormality detected during the assembling of the ECU 1 into the vehicle remains within the standby standby RAM 9. Therefore, any trouble and failure that have occurred during the assembling of the ECU 1 into the vehicle may be readily analyzed by reading the DTC stored in the standby RAM 9 in order, for example, to identify and diagnose legitimate abnormalities occurring during manufacture. This function of the standby RAM 9 can be recognized in any following example embodiments.

The CPU 3 is programmed to transmit the DTC in the standby RAM 9 to the external tool 27, upon receiving one command such as a first read command requesting the DTC in the standby RAM 9 among the commands that are transmitted from the external tool 27. The CPU 3 may be programmed to transmit the DTC in the EEPROM 11 to the external tool 27, upon receiving another command such as a second read command requesting the DTC in the EEPROM 11.

When the operation for transmitting the first read command is conducted, the external tool 27 transmits the first command to the ECU 1, and also displays the DTC stored in the standby RAM 9, which may be transmitted from the ECU 1, on the display device of the external tool 27. Likewise, when the operation for transmitting the second read command is conducted, the external tool 27 transmits the second command to the ECU 1, and also displays the DTC stored in the EEPROM 11, which may be transmitted from the ECU 1, on the display device of the external tool 27.

Hence, the DTC in the standby RAM 9 and the DTC in the EEPROM 11 are retrieved and transferred to the external tool 27 by operating the external tool 27, thereby making it possible to display the DTC on the display device of the external tool 27 or other similar devices.

In the ECU 1, because the EEPROM storage permission flag is stored in the EEPROM 11, a change in the EEPROM storage permission flag, for example, from the off-state to the on-state may be retained even if an in-vehicle battery is removed from the vehicle or the battery has run down. It is thereby possible to surely prevent the storage of the DTC in the EEPROM 11 from being unintentionally returned to a non-permission state where storage of the DTC is prohibited after the start of use of the vehicle by the user.

In the present example embodiment, the CPU 3 operates as a diagnosing means by executing the process of S110, S120, S130 and S150, as a storage permitting means by executing the process of S140, and as a permission switching means by executing the permission changing process of S310 and S320. The EEPROM storage permission flag amounts to permission/non-permission data, and therefore the EEPROM 11, having a storage area for storing the EEPROM storage permission flag therein, operates as a permission/non-permission data storing means. Also, the external tool 27 operates as an external device, and outputs the EEPROM storage permission command as a storage permission command.

Second Example Embodiment

In a second example embodiment shown in FIG. 5, the ECU 1 and the navigation device 23 including the radio communication device 25 are provided in the vehicle 35 in the similar manner as in the first example embodiment. The ECU 1 is configured to receive the EEPROM storage permission command from the data processing device 33 of the data center 31 that executes a process for implementing, for example, a telematics service for vehicles.

As will be appreciated, telematics refers generally to information transfer to and from a vehicle. While a vehicle telematics system may be used for a number of purposes, including collecting road tolls, intelligent transportation systems, tracking vehicle locations, recovering stolen vehicles, automatic vehicle crash notification, location-driven driver information services, dedicated short range communications DSRC, in-vehicle early warning notification alerts for car accident prevention and the like.

The data processing device 33 includes a server and a communication device, and communicates with the radio communication device 25 through a public line for cellular phone. Through communication with the vehicle 35, the data processing device 33 collects data such as the present position, operating condition or presence/absence of a failure from the vehicle 35. In return or response, the data processing device 33 transmits road traffic data or guide data of vehicle inspection and maintenance to the vehicle 35 based on the collected data, so that the data is displayed on the display device of the navigation device 23.

The data center 31 is configured to receive various data from a car dealer 37 having a terminal device 39 coupled, for example, to a computer system. When the car dealer 37 sells the vehicle 35 equipped with the ECU 1 to a user, registration data related to the vehicle 35 is input to the terminal device 39 before actual delivery to the user. The registration data includes, for example, a vehicle identification number and a registration number associated with the vehicle 35 and further may include the name, residence, phone number, e-mail address, and other information associated with the user. After the input of the registration data into the terminal device 39, the registration data is transmitted to the data processing device 33 through a public line or a dedicated line.

Figure 6:
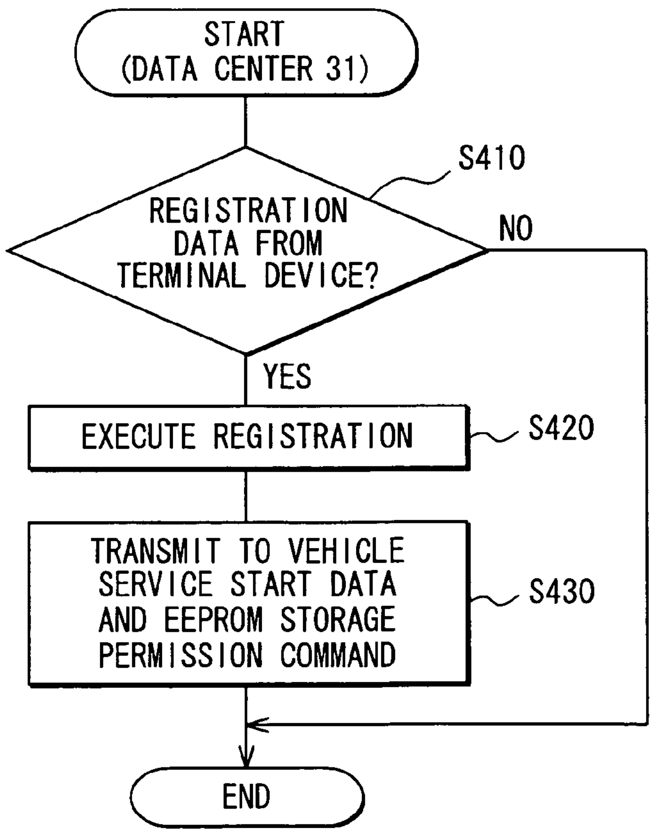
FIG. 6 is a flowchart illustrating a service starting process executed by a data processing device of a data center in accordance with the second example embodiment.

The data processing device 33 is programmed to regularly execute a service starting process as shown in FIG. 6 according to a given time period. In the service starting process, it is first checked at S410 whether the registration data has been received from the terminal device 39. If the registration data has not been received, the service starting process is terminated. If the registration data has been received, the processing is advanced to S420, and a registering process for storing the received registration data is conducted. Then, at S430, the service start data indicating that the implementation of service has been started, and the EEPROM storage permission command are transmitted to the vehicle 35 associated with the registration data received as described above. The service starting process is thereafter terminated.

In the vehicle 35, the service start data and the EEPROM storage permission command from the data center 31 are received by the radio communication device 25. Upon receiving the service start data from the data center 31, the navigation device 23 displays a message on the display device indicating and thereby notifying the user that the telematics service may be enjoyed. When the data processing device 33 transmits the service start data to the vehicle 35, the service for the vehicle 35 starts.

In the vehicle, the navigation device 23 transfers the EEPROM storage permission command received from the data center 31 to the ECU 1 through the communication line 21. Then, in the ECU 1, the EEPROM storage permission flag in the EEPROM 11 is rewritten from the off-state to the on-state in the similar manner as in the first example embodiment shown in FIG. 4, to thereby permit the storage of the DTC in the EEPROM 11.

Thus, upon receiving the EEPROM storage permission command transmitted at the time of starting the implementation of the service from the data center 31, the ECU 1 changes the EPROM storage permission flag from the off-state to the on-state.

Therefore, even when the user does not conduct the specific operation for transmitting the EEPROM storage permission command to the ECU 1, only the unnecessary DTC before the vehicle 35 starts to be used by the user may be prevented from being stored as the PDTC in the EEPROM 11 as in the first example embodiment. Further, since the registration data are transmitted from the car dealer 37 to the data center 31 without fail every time the vehicle 35 is sold, the EEPROM storage permission command may be received from the data center 31 automatically.

Third Example Embodiment

In a third example embodiment shown in FIG. 7, a managing device 43 including a computer is provided in a manufacturing plant 41 of the vehicle 35 into which the ECU 1 and the navigation device 23 are assembled. Management data indicating whether the manufacturing of each vehicle 35 has been completed is input to the managing device 43. The managing device 43 regularly transmits the management data to the data processing device 33 through the public line or the dedicated line according to a given time period or every time the management data is updated. The management data includes, for example, data indicative of the vehicle identification number and whether the vehicle associated with the vehicle identification number has been completed.

The ECU 1 is programmed to make a periodic access to the data processing device 33 each time electric power is supplied to the ECU 1 and the radio communication device 25. The signal that is transmitted at the time of accessing includes vehicle data such as the vehicle identification number specific to the vehicle 35.

Figure 8:
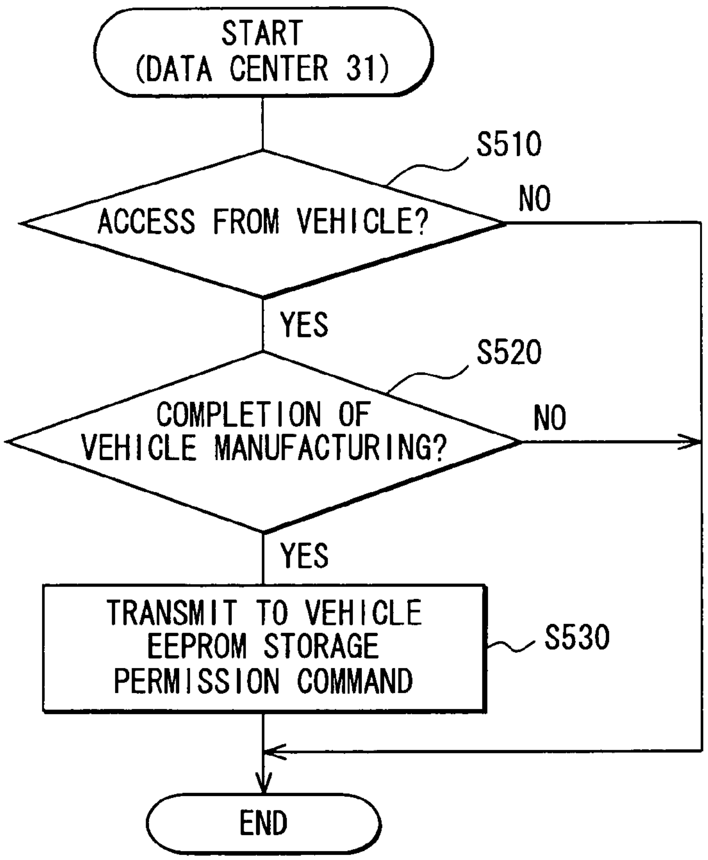
FIG. 8 is a flowchart illustrating an EEPROM storage permission command transmitting process executed by the data processing device of the data center in accordance with the third example embodiment.

The data processing device 33 is programmed to execute the EEPROM storage permission command transmitting process shown in FIG. 8 every given period. In the EEPROM storage permission command transmitting process, it is first checked at S510 whether an access has been received from the radio communication device 25. If no access has been received, the process is ended. If it is determined that the access has been received, the processing is advanced to S520.

In S520, it is checked at S520 whether the vehicle that made the access has been completely manufactured, based on the management data that has been received from the managing device 43. More specifically, it is checked whether the management data indicative of the completion of manufacture of the vehicle 35 has been received from the managing device 43. If it is determined that the manufacture of the vehicle 35 has not been completed, the EEPROM storage permission command transmitting process is ended. If it is determined that the manufacture of the vehicle 35 has been completed, the EEPROM storage permission command is transmitted to the vehicle 35 at S530, and the EEPROM storage permission command transmitting process is ended.

In the vehicle 35 to which the EEPROM storage permission command is transmitted from the data center 31, the EEPROM storage permission command from the data center 31 is transferred from the navigation device 23 to the ECU 1 through the communication line 21 as in the second example embodiment. In the ECU 1, the EEPROM storage permission flag in the EEPROM 11 is rewritten or switched from the off-state to the on-state in the similar manner as in the foregoing example embodiments shown in FIG. 4.

In the third example embodiment, even if the radio communication device 25 starts to operate and accesses the data processing device 33 during manufacture while not yet completed, the EEPROM storage permission command is not transmitted from the data processing device 33. When the radio communication device 25 accesses the data processing device 33 after final assembly of the vehicle 35 has been completed, the EEPROM storage permission command is automatically transmitted from the data processing device 33 to the vehicle 35, and the DTC is permitted to be stored as a PDTC in the EEPROM 11. Hence, the system provides the same advantages as those in a second example embodiment.

In a third example embodiment, upon access by the radio communication device 25, it is possible that the data processing device 33 can transmit a request signal at S520 to the managing device 43 that requests the management data about the vehicle 35, and checks whether the vehicle 35 has been completed based on the management data transmitted from the managing device 43 in response to the request signal.

Fourth Example Embodiment

In a fourth example embodiment shown in FIG. 9, a computer in the navigation device 23 is programmed to periodically transmit position data indicative of the present position of the vehicle 35 to the data processing device 33 to receive the EEPROM storage permission command. The data processing device 33 is programmed to regularly execute the EEPROM storage permission command transmitting process shown in FIG. 10 according to a given period, that is, at given intervals.

In the EEPROM storage permission command transmitting process, it is first checked at S610 whether the vehicle 35 has moved out of a specified region 45 based on the position data from the vehicle 35. The specified region 45 includes a site or premise of the manufacturing plant where the vehicle 35 is manufactured or a portion associated with the site or premise where vehicles under manufacture are staged or from where completed vehicles are transported or shipped to other places such as car dealerships. The vehicle 35 that has moved out of the specified region 45 is a vehicle that has been completed but has not yet been delivered to and used by a user.

If it is determined that the vehicle 35 has not moved out of the specified region 45 at S610, the EEPROM storage permission command transmitting process is ended. If it is determined that the vehicle 35 has moved out of the specified region 45, processing is advanced to S620.

If it is determined that the vehicle 35 has moved out of the specified region 45 at S620, the EEPROM storage permission command is transmitted and the EEPROM storage permission command transmitting process is terminated.

The EEPROM storage permission command from the data center 31 is transferred to the ECU 1 of the vehicle 35 from the navigation device 23 through the communication line 21 as in a second and a third example embodiment. In the ECU 1, the EEPROM storage permission flag in the EEPROM 11 is rewritten from the off-state to the on-state in the similar manner as in the foregoing example embodiments as shown in FIG. 4.

In a fourth example embodiment, when the vehicle 35 moves out of the specified region 45, the EEPROM storage permission command is automatically transmitted from the data processing device 33 to the vehicle 35, and the DTC is permitted to be stored as a PDTC in the EEPROM 11 by the CPU 3 of the vehicle 35. Hence, the system provides the same advantages as those in a second and a third example embodiment.

The specified region 45 may be set to a site of the car dealer associated with the vehicle 35, or a service area for replacing a failing ECU 1 at the site of the car dealer or at another designated site. A fourth example embodiment may be modified such that the navigation device 23 of the vehicle 35 executes the same process as that of FIG. 10.

Specifically, the navigation device 23 always detects the position of a subject vehicle such as the vehicle 35. The navigation device 23 can determine whether the subject vehicle 35 has moved out of the specified region 45, based on the detected position. When it is determined that the subject vehicle 35 has moved out of the specified region 45, the EEPROM storage permission command may be transmitted to the ECU 1 through the communication line 21 without communication with the data center 31. In such a case, the navigation device 23 operates as the external device in that it is provided separately from the ECU 1.

Fifth Example Embodiment

Figure 11:
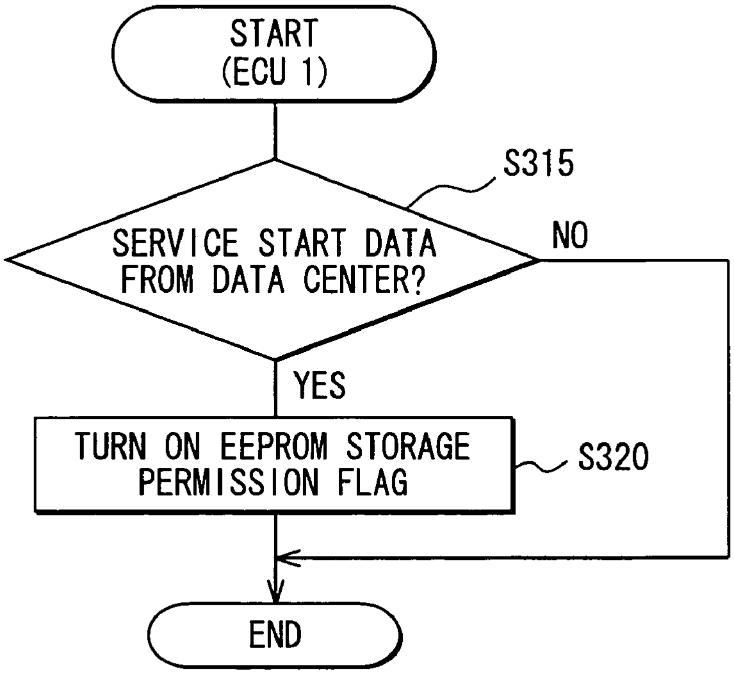
FIG. 11 is a flowchart illustrating a permission switching process executed by the CPU in accordance with a fifth example embodiment.

In a fifth example embodiment, although similar to the second example embodiment shown in FIG. 5 and FIG. 6, the CPU 3 is programmed to execute the permission switching process shown in FIG. 11 instead of the permission switching process of FIG. 4. Also, service start data from the data center 31 to the vehicle 35 is transferred to the ECU 1 from the navigation device 23 through the communication line 21.

When the CPU 3 starts the permission switching process of FIG. 11, the CPU 3 first checks at S315 whether the service start data has been received from the data center 31. If it is determined that the service start data has not been received, the permission switching process is ended. If it is determined that the service start data has been received, processing is advanced to S320, and the CPU 3 turns on the EEPROM storage permission flag, that is, rewrites the EEPROM storage permission flag in the EEPROM 11 to the on-state, thus ending the permission switching process.

Specifically, in the fifth example embodiment, when it is detected that the service start data has been transmitted from the data processing device 33 to the vehicle 35 including the ECU 1, corresponding to YES at S315, the EEPROM storage permission flag is changed from the off-state to the on-state.

Thus, the storage of the DTC in the EEPROM 11 is automatically permitted at the time of starting the service for the vehicle 35 by the data center 31 and immediately before the vehicle 35 starts to be used by the user. Hence, without any specific manual operation of the user, the same advantages as those described in the ECU 1 of the first example embodiment may be provided. Further, the data processing device 33 need not transmit the EEPROM storage permission command to the vehicle 35.

The present example embodiment may be modified such that the service start data is not transferred from the navigation device 23 to the ECU 1, but that, upon receiving the service start data from the data center 31, the navigation device 23 transmits to the ECU 1 annunciation data indicating that the service start has been transmitted from the data center 31, and the CPU 3 checks at S315 whether the annunciation data has been received.

Sixth Example Embodiment

Figure 10:
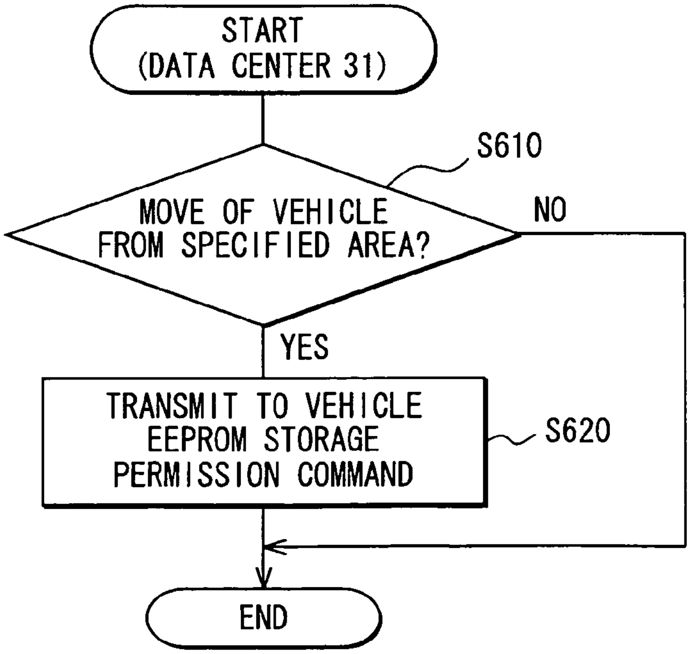
FIG. 10 is a flowchart illustrating an EEPROM storage permission command transmitting process executed by the data processing device of the data center in accordance with the fourth example embodiment.
Figure 12:
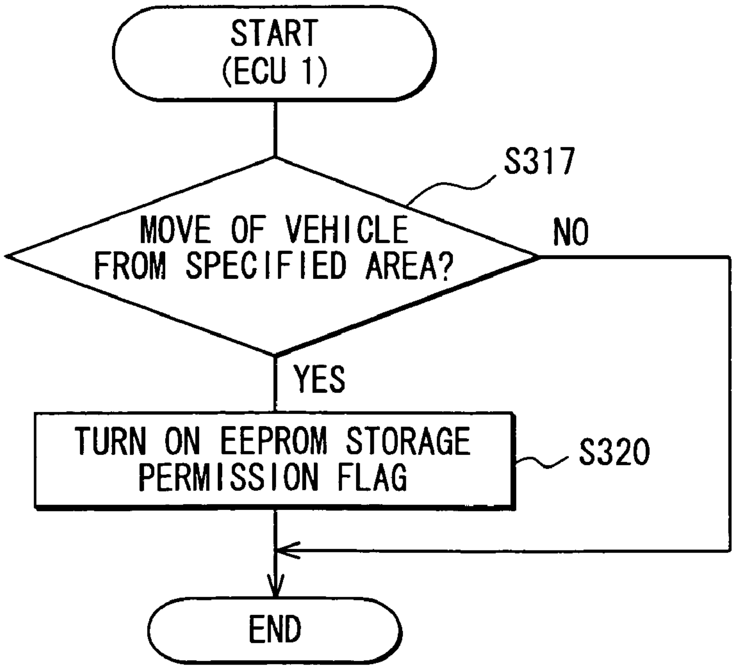
FIG. 12 is a flowchart illustrating a permission switching process executed by the CPU in accordance with a sixth example embodiment.

In a sixth example embodiment, although similar to the fourth example embodiment shown in FIG. 9 and FIG. 10, the CPU 3 is programmed to execute the permission switching process shown in FIG. 12 instead of the permission switching process of FIG. 4. Further, the position data of the vehicle 35 is periodically transmitted to the ECU 1 from the navigation device 23 without communication with the data center 31.

When the CPU 3 starts the permission switching process shown in FIG. 12, the CPU 3 first checks at S317 whether the subject vehicle 35 has moved out of the specified region 45 such as the manufacturing plant site based on the position data from the navigation device 23. If it is determined that the subject vehicle 35 has not moved out of the specified region 45, the permission switching process is ended. However, if it is determined that the subject vehicle 35 has moved out of the specified region 45, the processing is advanced to S320, and the EEPROM storage permission flag in the EEPROM 11 is rewritten to the on-state, thus ending the permission switching operation.

Thus when it is detected that the subject vehicle 35 has moved out of the specified region 45, corresponding to YES at S317, the EEPROM storage permission flag is changed from the off-state to the on-state.

When the vehicle 35 moves out of the specified region 45, the DTC is permitted to be stored as a PDTC in the EEPROM 11 as in the fourth example embodiment. As a result, even when the user does not conduct the specific operation, the same advantages as in the foregoing example embodiments may be provided.

In the present example embodiment, it is unnecessary that the data processing device 33 transmits the EEPROM storage permission command. The present example embodiment may be modified such that the checking of the position of the vehicle 35 is made by the navigation device 23 instead of by the ECU 1. In such a case, the navigation device 23 is programmed to determine the position of the vehicle 35 and also to output to the ECU 1 annunciation data indicative of the movement of the vehicle 35 from the specified region 35. The CPU 3 checks whether the annunciation data has been received in place of S317 of FIG. 12.

Seventh Example Embodiment

In a seventh example embodiment, although similar to the first example embodiment shown in FIG. 1 to FIG. 4, a scan tool is used as the external tool 27. The scan tool may be a conventional fault diagnostic device available in the market and meets the standards of the on-board diagnostics version 2 (OBD II) and more specifically International Organization for Standardization standard ISO 15765 entitled "Road vehicles-Diagnostics on Controller Area Networks (CAN)," International Organization for Standardization, 2004. The scan tool may be detachably connected to the communication line 21 when the failure diagnosis of the vehicle is conducted, for example, in a car dealer, vehicle repair shop, or in a vehicle maintenance shop other than the car dealer.

The scan tool has the same function as that of the external tool 27 used in the first example embodiment, but does not conduct the processing of FIG. 3. That is, the scan tool is not programmed to transmit the EEPROM storage permission command. Instead, the scan tool is programmed such that, upon connection to the communication line 21, a support data inquiry command is automatically transmitted that inquires as to the kind of data that may be output to the scan tool from the ECU 1 for confirmation of the connection.

In the present example embodiment, the support data inquiry command is, for example, a command of a data string such as "$7DF, $01, $00". It will be appreciated that the symbol "$" indicates that a trailing numeral is a numeral of HEX decimal.

The CPU 3 is programmed such that, upon receiving the support data inquiry command, the ECU 1 returns data to the scan tool indicating the kind of failure diagnosis data that may be output to the scan tool by the ECU 1. A list indicative of the kind of data that may be output by the ECU 1 is then displayed on the display device of the scan tool. Hence, the user of the scan tool is capable of knowing what kind of failure diagnosis data may be extracted from the ECU 1 by the aid of the display contents.

Figure 13:
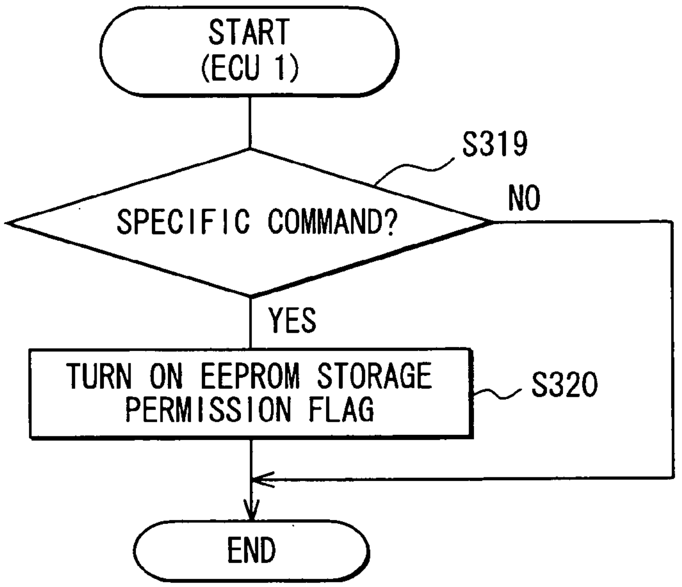
FIG. 13 is a flowchart illustrating a permission switching process executed by the CPU in accordance with a seventh example embodiment.

The CPU 3 is further programmed to execute the permission switching process shown in FIG. 13 instead of the permission switching process shown in FIG. 4. Upon starting the permission switching process of FIG. 13, the CPU 3 first checks at S319 whether the support data inquiry command, which is a specific command in FIG. 13, has been received from the scan tool. If it is determined that the CPU 3 has not received the support data inquiry command, the permission switching process is ended. If it is determined that the CPU 3 has received the support data inquiry command, the processing is advanced to S320, and the EEPROM storage permission flag in the EEPROM 11 is rewritten to the on-state, and the permission switching process is thereafter terminated.

In the ECU 1, upon receiving the support data inquiry command from the scan tool with the connection of the scan tool to the communication line 21, the EEPROM storage permission flag is turned on. As a result, the DTC is permitted to be stored as a PDTC in the EEPROM 11 at S150 of FIG. 2. That is, the support data inquiry command from the scan tool has the same function as the EEPROM storage permission command in the first example embodiment.

In some cases, if failed, the ECU 1 may be replaced for example after the vehicle has been made available in the market, or a vehicle has been shipped out of the manufacturing plant such as out of, for example, specified region 45, in a state where an EEPROM storage permission flag has not been switched from the off-state to the on-state through error. Even in such a situation, when the scan tool is connected to the ECU 1, the DTC may be permitted to be stored in the EEPROM 11. Hence, the present example embodiment is advantageous in that the DTC is permitted to be stored in the EEPROM 11 immediately before use of the vehicle is started.

Moreover, because the DTC may be permitted to be stored in the EEPROM 11 by connection of the scan tool to the communication line 21 of the vehicle without complicated operation, even if the specific operation for permitting an ECU to store a PDTC into the EEPROM, as shown in the first example embodiment, is not conducted through error in the manufacturing plant, etc., it is possible to later rewrite the storage permission flag of the EEPROM 11.

The example of this embodiment can be utilized in any other example embodiments. For example, in the first example embodiment the scan tool may be substitute for the external tool 27.

Eighth Example Embodiment

Figure 14:
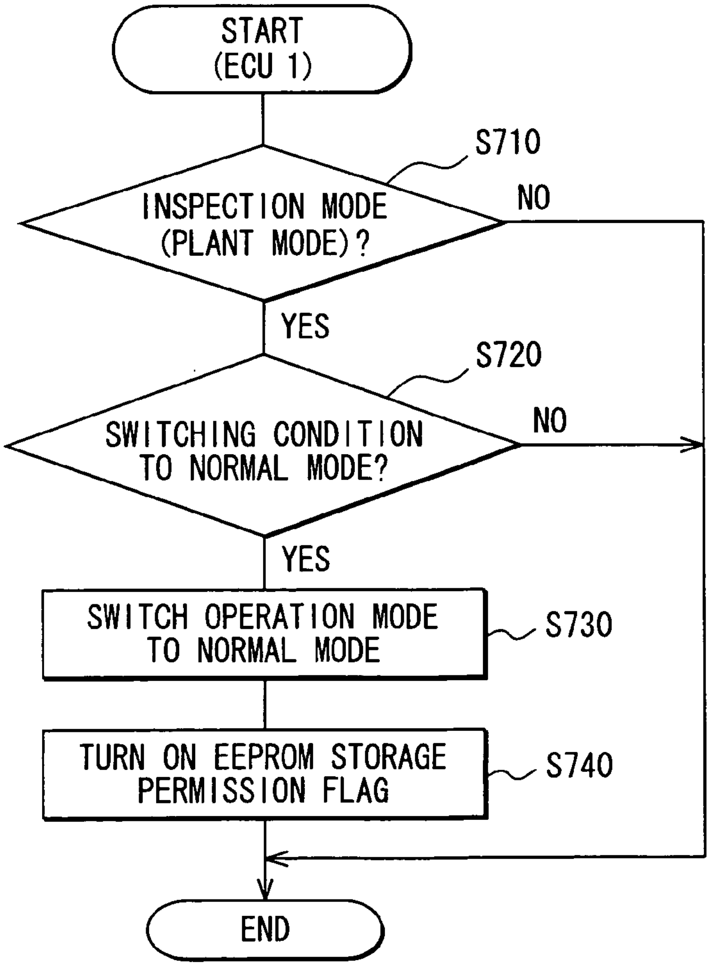
FIG. 14 is a flowchart illustrating a permission switching process executed by the CPU in accordance with an eighth example embodiment.

In an eighth example embodiment, although similar to the first example embodiment, the CPU 3 is programmed to regularly execute the permission switching process of shown in FIG. 14 according to a given period instead of the permission switching process of FIG. 4. The permission switching process of FIG. 14 is executed regardless of an operation mode.

Upon starting the permission switching process of FIG. 14, the CPU 3 first checks at S710 whether the operation mode of the CPU 3, particularly the operation mode of the ECU 1, is a function inspection mode.

The function inspection mode is a specific operation mode that may be referred to as plant mode and may be used in the manufacturing plant of the vehicle or the car dealer as a mode for conducting the function inspection related to the ECU 1. Plant mode is a conventional mode and is used routinely at a last stage of manufacture before shipment. Another mode is a normal mode corresponding to the operation mode when the vehicle is used by a user. For example, in the function inspection mode, for confirmation of the load operation, specific loads such as, for example, lamps and instrument gauges disposed in an instrument panel of the vehicle are directly activated one by one. A specific diagnosing process is conducted in generally the same manner as the diagnosing process of S110, but with different normal/abnormal determination threshold levels set to be, for example, more severe than that the thresholds that are used at S110.

Upon receiving the function inspection mode switch command from the external tool 27, the CPU 3 switches the operation mode from the normal mode, which executes the normal operation, to the function inspection mode. Thereafter, when the condition for switching to the normal mode is met, that is, a predetermined function inspection is completed, the CPU 3 returns from the function inspection mode to the normal mode. The condition for switching to the normal mode may include a predetermined number of times that the ignition switch changes from the off-state to the on-state, or a reception of the normal mode switch command by the CPU 3 from the external tool 27. The number of times that the condition of the ignition switch is changed to the on-state may correspond to, for example, the number of times normally required in the function inspection mode. Alternatively, the number of times may be increased.

Thus, in the manufacturing plant of the vehicle, after completion of assembly of the ECU 1 into a vehicle, the function inspection mode switch command is transmitted to the ECU 1 from the external tool 27 to operate the ECU 1 in the function inspection mode. As a result, the presence or absence of abnormality is confirmed with high efficiency. For example, it may be visually confirmed whether the lamps or the instrument gauges normally operate or not, by the above forced load activating function, and it may be confirmed whether all the sensors or the switches are normally connected and functioning by retrieving the diagnosis results of the specific diagnosing process to the external device 27.

After it is confirmed that there is no abnormality, the ECU 1 is returned from the function inspection mode to the normal mode by determining that the condition for switching to the normal mode is met. Then, by initially fulfilling a transition condition for mode switching from inspection to normal, the vehicle is shipped. The above work may also be conducted when the failing ECU 1 is replaced with a new one in the car dealer.

Returning to FIG. 14, if it is determined at S710 that the operation mode is not the function inspection mode but, rather, is the normal mode, the permission switching process is ended. If it is determined that the operation mode is the function inspection mode, the processing is advanced to S720.

In S720, it is checked whether the above mentioned condition for switching to the normal mode is met. If the condition for switching to the normal mode is not met, the permission switching process is ended. If it is determined at S720 that the condition for switching to the normal mode is met, the processing is advanced to S730, and the operation mode is switched to the normal mode. Then, in subsequent S740, the EEPROM storage permission flag in the EEPROM 11 is turned on and rewritten to the on-state, thus ending the permission switching process.

In the eighth example embodiment, when the operation mode switches from the function inspection mode to the normal mode, the DTC is permitted to be stored as a PDTC in the EEPROM 11 from that time at S150 of FIG. 2.

Hence, the time when the EEPROM 11 is permitted to store the DTC is made certain as in other example embodiments, and the storage in the EEPROM 11 of any DTC that is unnecessary or erroneous based on determination of the DTC before the start of vehicle use by the user and before completion of inspection may be prevented.

The storage of the DTC into the EEPROM 11 is effectively permitted before the vehicle starts to be used by the user and after the assembling of the ECU 1 into the vehicle and the conventional function inspection routine in the function inspection mode have been completed. Moreover, it is not necessary to manually conduct any additional operation for the sole purpose of permitting the storage of the DTC in the EEPROM 11.

In the eighth example embodiment, the CPU 3 operates as a permission switching means at a time of mode switching by executing the process of FIG. 14. The eighth example embodiment may be modified such that the CPU 3 executes the permission switching process of FIG. 4 in addition to the switching process of FIG. 14, to permit the storage of the DTC in the EEPROM 11 according to the EEPROM storage permission command from the external tool 27.

Further, the eighth example embodiment may be modified such that the CPU 3 also executes the permission switching process of FIG. 13, in addition to the switching process of FIG. 1, to permit the storage of the DTC in the EEPROM 11 according to the support data inquiry command transmitted at the time of connection of the scan tool.

Also, the time of permitting storage of the DTC into the EEPROM 11 need not be the exact time or correspond to the time when the operation mode switches from the function inspection mode to the normal mode. It may be set to another time, such as, for example a predetermined interval after the mode switching time, but before the use of the vehicle by the user begins. The predetermined interval may be set in units of seconds, minutes or hours in consideration of the transport of the vehicle to users.

The present invention should not be limited to the foregoing example embodiments, but may be implemented in many other ways without deviating from the invention.

For example, the rewritable nonvolatile memory should not be limited to the EEPROM 11, but may be, for example, a flash memory. Also, the control data is not limited to a flag such as the EEPROM storage permission flag, but may be a plurality of bits of data.

Further, to provide a degree of redundancy to the foregoing example embodiments, the CPU 3 may be further programmed to turn on the EEPROM storage permission flag when it is determined that the vehicle 35 is used by the user. That is, each of the foregoing example embodiments may be modified such that the ECU 1 is additionally provided with a function of determining whether the vehicle 35 is used by the user based on, for example, the operating state of the vehicle 35 such as the vehicle speed or the engine revolutions. For example, the use of the vehicle 35 by the user may be determined when the vehicle travels a predetermined distance. The ability to provide redundancy through such an additional function is advantageous so as to ensure with a high degree of probability that the EEPROM storage permission flag is turned on after use of the vehicle by the user is started, even when the EEPROM storage permission flag has not been turned on before the start of use of the vehicle for some reason.

Still further, as an alternative to the foregoing example embodiments or as a redundancy to the foregoing example embodiments, the CPU 3 may be further programmed to automatically turn on EEPROM storage permission flag when it is detected by a sensor that a license plate is attached to the vehicle 35 or a fuel tank of the vehicle is filled up to a certain level with fuel, indicating that the vehicle 35 will soon be placed into use.

What is claimed is:

1. An electronic control unit for vehicle diagnosis comprising:

a rewritable nonvolatile memory;

diagnosing means for diagnosing a vehicle device mounted in a vehicle based on a signal from the vehicle device and store in the rewritable nonvolatile memory a diagnosis result indicating abnormality of the vehicle device;

control data storing means for storing control data indicating whether storage of the diagnosis result in the rewritable nonvolatile memory is permitted;

navigation means for detecting and providing position data of the vehicle;

checking means for checking whether the vehicle has moved out of a specified region based on the position data of the navigation means;

permission switching means for changing the control data from non-permission to permission upon detecting that the vehicle has moved out of the specified region by the checking means; and storage permitting means for permitting the diagnosing means to store the diagnosis result in the rewritable nonvolatile memory only when the control data within the control data storing means is indicative of the permission, the storage permitting means maintaining the diagnosis result stored in the rewritable nonvolatile memory irrespective of power supply to the nonvolatile memory.

2. The electronic control unit according to claim 1, further comprising:

a standby RAM continuously supplied with electric power to maintain storage of data, wherein the diagnosing means stores the diagnosis result in the standby RAM irrespective of the control data.

3. The electronic control unit according to claim 1, wherein the rewritable nonvolatile memory includes a first storage area as the control data storing means for storing the control data and a second storage area for storing the diagnosis result.

4. The electronic control unit according to claim 2, wherein the rewritable nonvolatile memory includes a first storage area as the control data storing means for storing the control data and a second storage area for storing the diagnosis result.

5. The electronic control unit according to claim 1, wherein the specified region is a region, in which the vehicle is present before being used by a user of the vehicle.

6. The electronic control unit according to claim 2, wherein the specified region is a region, in which the vehicle is present before being used by a user of the vehicle.

7. The electronic control unit according to claim 3, wherein the specified region is a region, in which the vehicle is present before being used by a user of the vehicle.

8. An electronic control unit for vehicle diagnosis comprising:

a rewritable nonvolatile memory;

a navigation device configured to detect and provide position data of a vehicle;

a checking device configured to check whether the vehicle has moved out of a specified region based on the position data of the navigation device; and a processing unit configured to diagnose a vehicle device mounted in the vehicle based on a signal from the vehicle device and store in the rewritable nonvolatile memory a diagnosis result indicating abnormality of the vehicle device, wherein the processing unit is further configured to change a control data from non-permission to permission upon detecting that the vehicle has moved out of the specified region by the checking device, the control data indicating whether storage of the diagnosis result in the rewritable nonvolatile memory is permitted, and wherein the processing unit is further configured to permit storing of the diagnosis result in the rewritable nonvolatile memory only when the control data is indicative of the permission and maintain the diagnosis result in the rewritable nonvolatile memory irrespective of power supply to the nonvolatile memory.

9. The electronic control unit according to claim 8, further comprising:

a standby RAM continuously supplied with electric power to maintain storage of data, wherein the processing unit is further configured to store the diagnosis result in the standby RAM irrespective of the control data.

10. The electronic control unit according to claim 8, wherein the rewritable nonvolatile memory includes a first storage area for storing the control data and a second storage area for storing the diagnosis result.

11. The electronic control unit according to claim 8, wherein the specified region is a region, in which the vehicle is present before being used by a user of the vehicle.

12. A method for controlling storage of data in a rewritable nonvolatile memory of an electronic control unit for a vehicle, the method comprising:

diagnosing a vehicle device mounted in the vehicle based on a signal from the vehicle device;

storing control data indicating whether a diagnosis result indicating abnormality of the vehicle device is permitted to be stored in the rewritable nonvolatile memory;

detecting and providing position data of the vehicle;

checking whether the vehicle has moved out of a specified region based on the position data of the vehicle;

changing the control data from non-permission to permission upon detecting that the vehicle leaves the specified region; and storing the diagnosis result in the rewritable nonvolatile memory, only when the control data is indicative of the permission; and maintaining the diagnosis result stored in the rewritable nonvolatile memory irrespective of power supply to the nonvolatile memory.

13. The method according to claim 12, further comprising:

storing the diagnosis result in a standby RAM irrespective of the control data, the standby RAM continuously supplied with electric power to maintain storage of data.

14. The method according to claim 12, wherein the control data is stored in a first storage area of the rewritable nonvolatile memory and the diagnosis result is stored in a second storage area of the rewritable nonvolatile memory.

15. The electronic control unit according to claim 1, wherein:

the specified region is set to be a region, where the vehicle is present before being sold to a user; and the diagnosis result stored in the rewritable nonvolatile memory indicates the abnormality of the vehicle device present before the vehicle is sold.

16. The electronic control unit according to claim 15, wherein:

the navigation means is provided in the vehicle and transmits the position data therefrom; and the permission switching means is located outside the vehicle to determine whether the vehicle has moved out of the specified region based on the position data transmitted from the navigation means and transmit the permission to the vehicle when the vehicle has moved out of the specified region.

17. The electronic control unit according to claim 15, wherein:

the navigation means and the permission switching means are provided in the vehicle.

18. The electronic control unit according to claim 8, wherein:

the specified region is set to be a region, where the vehicle is present before being sold to a user; and the diagnosis result stored in the rewritable nonvolatile memory indicates the abnormality of the vehicle device present before the vehicle is sold.

19. The electronic control unit according to claim 18, further comprising:

a data center provided outside the vehicle and capable of radio communication with the navigation device of the vehicle to check whether the vehicle has moved out of the specified region based on the location data transmitted from the navigation device and transmitting a check result to the processing unit.

20. The method according to claim 12, wherein:

the specified region is set to be a region, where the vehicle is present before being sold to a user; and the diagnosis result stored in the rewritable nonvolatile memory indicates the abnormality of the vehicle device present before the vehicle is sold.

* * * * *